United States Patent [19]
Rudischhauser et al.

[11] Patent Number: 6,059,721
[45] Date of Patent: May 9, 2000

[54] ENDOSCOPE HAVING VARIABLE MAGNIFICATION AND FOCUSING

[75] Inventors: Jürgen Rudischhauser; Frank Lederer, both of Tuttlingen; Jan Dahmen, Seitingen, all of Germany

[73] Assignee: Karl Storz GmbH & Co. KG, Germany

[21] Appl. No.: 09/011,933

[22] PCT Filed: Aug. 19, 1996

[86] PCT No.: PCT/DE96/01529

§ 371 Date: Feb. 17, 1998

§ 102(e) Date: Feb. 17, 1998

[87] PCT Pub. No.: WO97/07422

PCT Pub. Date: Feb. 27, 1997

[30] Foreign Application Priority Data

Aug. 18, 1995 [DE] Germany ............... 195 30 427

[51] Int. Cl.[7] ............................................. A61B 1/00
[52] U.S. Cl. ..................... 600/167; 600/168; 359/705
[58] Field of Search ............................ 600/167, 168, 600/112, 163; 359/693, 705, 706, 380, 383, 643

[56] References Cited

U.S. PATENT DOCUMENTS

| 3,257,902 | 6/1966 | Hopkins . | |
|---|---|---|---|
| 4,076,018 | 2/1978 | Heckele . | |
| 4,425,025 | 1/1984 | Sunaga | 359/683 |
| 4,666,262 | 5/1987 | Zobel | 359/380 |
| 5,313,329 | 5/1994 | Ueda | 359/693 |
| 5,496,261 | 3/1996 | Sander | 600/163 |

FOREIGN PATENT DOCUMENTS

| 2348920 | 12/1990 | France . |
|---|---|---|
| 58072119 | 4/1983 | Japan . |
| 2267762 | 12/1993 | United Kingdom . |

*Primary Examiner*—John P. Leubecker
*Attorney, Agent, or Firm*—St. Onge Steward Johnston & Reens LLC

[57] ABSTRACT

An endoscope includes a shaft receiving at least a pair of the lens groups movable jointly to provide focusing of an image upon actuation of an adjusting wheel and adapted to be disengaged to have displacement of one of the pair of lens groups relative to the other lens group for adjusting a magnification of the image.

8 Claims, 2 Drawing Sheets

ENDOSCOPE HAVING VARIABLE MAGNIFICATION AND FOCUSING

TECHNICAL FIELD

The present invention relates to an endoscope having variable magnification according to the generic part of claim 1.

Endoscopes of this type are employed for medical and technical applications.

STATE OF THE ART

A generic endoscope is known from FR A 2 648 920. This printed publication describes the optical construction of an endoscope having variable magnification. In order to change the magnification of the generated eyepiece image, the two groups of lenses comprising the eyepiece are moved differently. Focusing occurs by moving the eyepiece as one unit.

A mechanical construction with which the relatively complicated movements of the individual groups can be realized is not described in this printed publication although it would be necessary, particularly, in an endoscope to realize the individual possible adjustments by means of a compact construction in order to prevent the eyepiece region, which is essential for handling, of the endoscope from becoming too large and too heavy.

Another endoscope having variable magnification is known from U.S. Pat. No. 4,666,262. This endoscope is also provided with an endoscope objective lens attached to its distal end, with an image relay which transmits the image of the endoscope objective lens to the proximal end, and with an eyepiece through which the image transmitted by the image relay is observed. The eyepiece is composed of several groups of lenses, some of which are adjustable, therefore the magnification of the eyepiece image is adjustable. Although the mechanical construction of this known endoscope is relatively simple, the pupil changes due to the selected optical construction of the eyepiece, which is disturbing in a number of applications.

DESCRIPTION OF THE INVENTION

The object of the present invention is to provide an endoscope having variable magnification of the eyepiece image with no change in the state of the pupil and in which the required movements can be carried out with a light and compact mechanical construction.

In the invented solution, at least one of the lens groups continues to be moveable for adjusting the magnification of the eyepiece image, whereas for focusing the eyepiece respectively the lens groups are moved as a unit. These movements are realized in that the lenses of the eyepiece not moved for adjusting the magnification are contained in a first tube in which at least one other tube containing a lens group moved for adjusting the magnification is conveyed in a moveable manner. The result is a very simple construction of the eyepiece tube without needing to substantially enlarge the external diameter of the eyepiece in relation to the endoscope while maintaining constant magnification of the eyepiece. The increase in weight is minimal so that the invented endoscope is well balanced and therefore feels good "in the hand".

The invented endoscope can, of course, possess variable magnification, thus be provided with a zoom eyepiece. Especially suited is the invented design, however, for two-position eyepieces.

In this case, the other tube can be retained in any of the magnification positions by a lock-in means in the first tube, in particular, by means of a spring-biased ball which engages in one of the two grooves in the first tube.

This embodiment has the particular advantage that it suffices to provide a single adjusting wheel with which magnification can be adjusted and the eyepiece image can be focused. For this purpose the adjusting wheel acts on the other tube in such a manner that when the adjusting wheel is rotated, first the first and the other tube are moved jointly. As the path of the movement of the first tube is limited on both sides by a stop respectively, when the adjusting wheel is rotated again, the other tube is conveyed from one magnification position to another magnification position. The adjusting wheel can act on the other tube via a worm wheel/gear engagement or a toothed rack/gear connection.

In the simplest embodiment of the present invention, only one lens group is moved to adjust the magnification of the eyepiece image. However, in order to improve image quality, it is an advantage if two lens groups are designed in a moveable manner.

For this purpose one of the two lens groups is contained in the other (second) tube, and the other moveable lens group is contained in a third tube. The third tube is pretensioned by a spring in the direction of the second tube with a stop limiting the movement path of the third tube.

As in the invented embodiment, the lens groups of the eyepiece are moved jointly in order to adjust focusing, it is especially advantageous if a glass cover is provided in the eyepiece which is preferably included in the optical calculation of the eyepiece elements.

A BRIEF DESCRIPTION OF THE DRAWING

The present invention is made more apparent in the following using preferred embodiments with reference to the drawing depicting in:

FIG. 1 a section through the proximal part of an invented endoscope, and

FIG. 2 the lenses of a preferred embodiment of a two-position eyepiece in both magnification positions.

DESCRIPTION OF A PREFERRED EMBODIMENT

Figure 1:
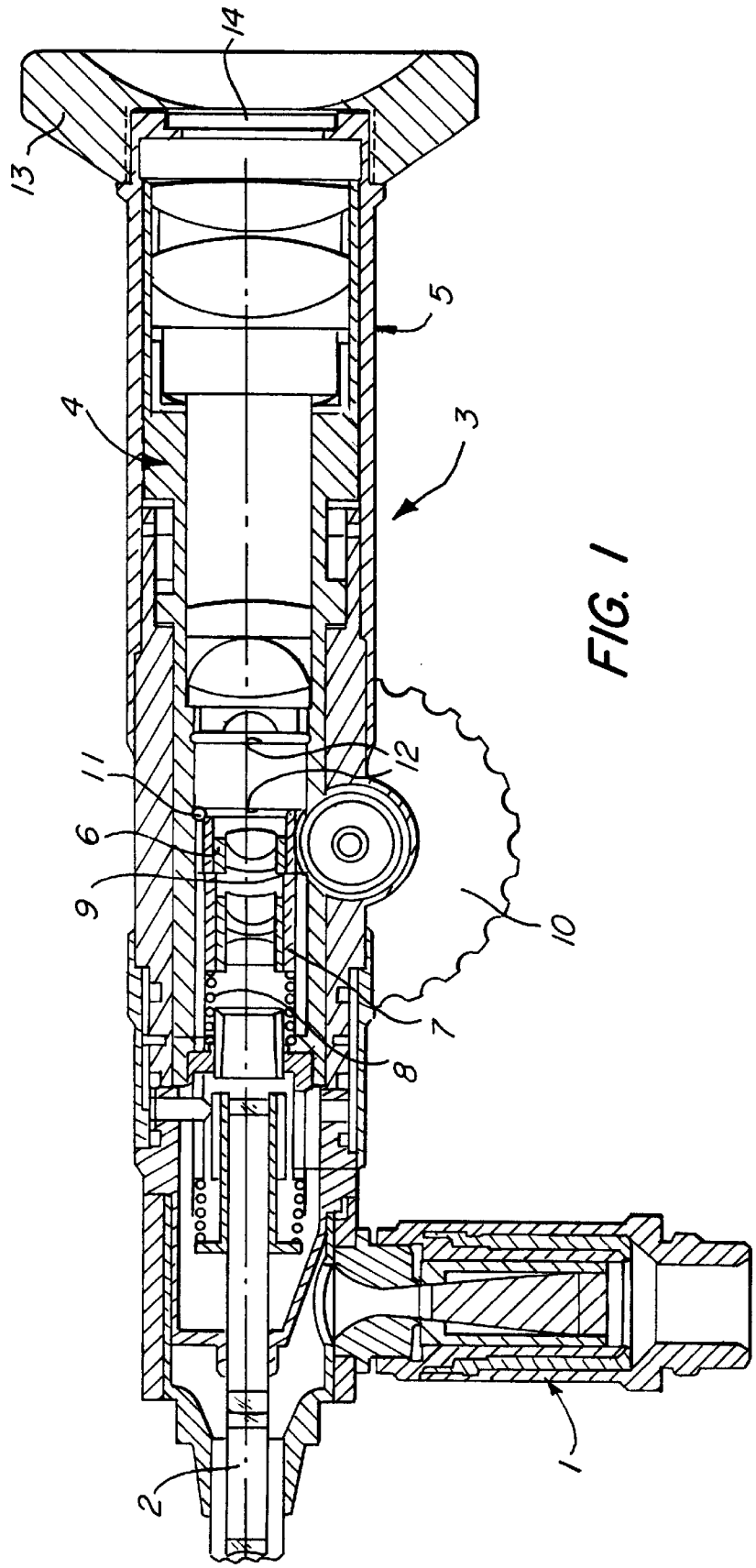

FIG. 1 shows the proximal part of a preferred embodiment of an invented endoscope. The endoscope is provided in an as such known manner with a light guide connection 1 through which the light from an illumination source, not depicted, is conveyed to the distal end of the endoscope, also not depicted.

The object field illuminated by this light is imaged by an endoscope objective lens (also not depicted) attached to the distal end and is transmitted by an image relay 2 to the proximal end. The image relay 2 can be, as in the shown preferred embodiment, composed of a relay lens system which is provided with a rod lens or a fiber bundle or a gradient lens system.

The (real) image transmitted to the proximal end is observed by means of an eyepiece optic 3 or imaged using a video camera flange-mounted to the eyepiece funnel 13.

Figure 2:
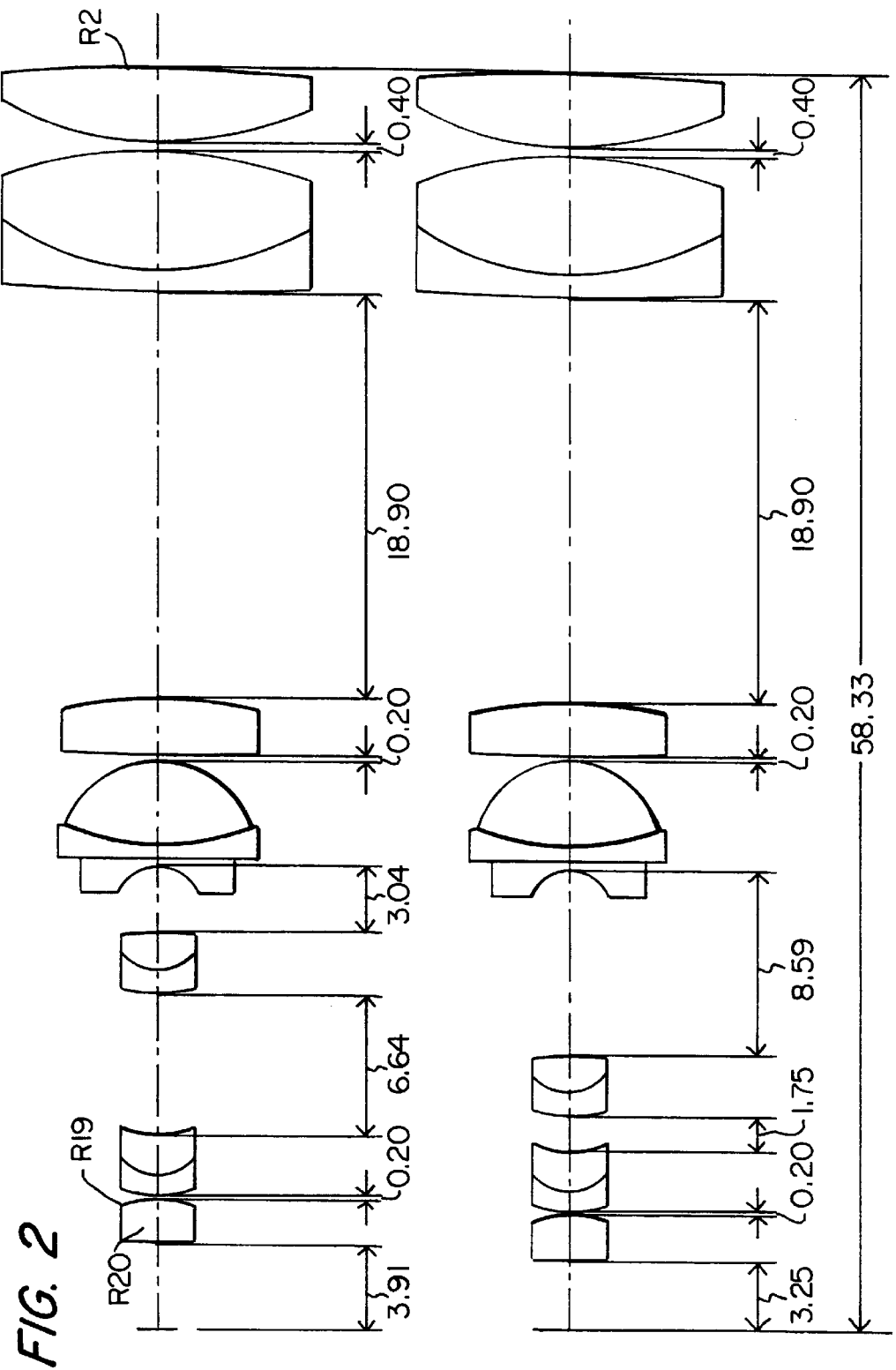

The lens system 3 of the two-position eyepiece is depicted in more detail in FIG. 2. The following table shows the radii $R_2$ to $R_{20}$, the air spaces respectively lens thicknesses including the materials for a preferred embodiment of the present invention and for one of the two magnification positions. The air spaces for the second magnification position are indicated in the lower section of FIG. 2. Surface $R_1$ is one of the two surfaces of the glass cover of the eyepiece.

In one position of the two-position eyepiece, magnification is 30-fold and in the other position 80-fold.

| Surface No. | Radius | Airspace/thickness | Material |
|---|---|---|---|
| 1 | plane | 11.67 | air |
| 2 | 62.64 | 3.50 | SK5 |
| 3 | −15.18 | 0.40 | air |
| 4 | 17.53 | 5.50 | SK16 |
| 5 | −12.32 | 1.0 | SFL6 |
| 6 | −145.38 | 8.57 | air |
| 7 | plane | 10.33 | air |
| 8 | 20.54 | 2.50 | S-SFL56 |
| 9 | plane | 0.20 | air |
| 10 | 4.22 | 4.00 | S-SF5 |
| 11 | −11.63 | 1.0 | S-SFL56 |
| 12 | 1.94 | 3.391 | air |
| 13 | 7.29 | 1.80 | S-LAF3 |
| 14 | −2.05 | 1.10 | S-SF10 |
| 15 | −5.87 | 6.64 | air |
| 16 | −3.50 | 1.75 | S-BAK4 |
| 17 | −2.05 | 0.90 | S-SFL56 |
| 18 | −4.47 | 0.20 | air |
| 19 | 5.46 | 2.0 | S-SF10 |
| 20 | plane | 3.91 | air |

The lenses figures correspond to the ones selected by Schott, Mainz, Germany.

As FIG. 2 shows, in the depicted preferred embodiment of the present invention, two groups of lenses are moved for adjusting the magnification. The two moved groups of lenses are the two distal-end-facing groups of lenses, whose diameter are relatively small in such a manner that the moving mechanism for adjusting the magnification can be compact and light.

The mechanism is made more apparent in the following with reference to FIG. 1:

In order to realize the mentioned movements, the stationary lenses of the eyepiece are contained in a first tube 4, which is contained in a moveable manner in an external tube 5 of the eyepiece part of the endoscope. A second tube 6 and a third tube 7 are contained in a moveable manner in the first tube 4. The third tube 7 is pretensioned by a spring 8 in the direction of the second tube 6, with a stop 9 limiting the movement path of the third tube.

A single adjusting wheel 10, which acts on the second tube 6 and moves it when rotated, is provided for adjusting magnification and focusing. The second tube 6 is determined in the two magnification positions by a lock-in means in the first tube 4. The lock-in means is produced by a spring-biased ball 11 which can engage one of two grooves 12 in the first tube according to the respective set magnification.

When the adjusting wheel 10 is rotated, first the first and the second tube are moved jointly. As the movement path is limited on both sides by stops, when the adjusting wheel of the second tube is rotated again, the second tube is conveyed from one magnification position to the other magnification position. The third tube follows the movement of the second tube due to the pretensioning by the spring with a stop limiting the movement path of the third tube.

A glass cover 14, which is included in the optical calculation of the eyepiece, is provided in the eyepiece funnel 13 for sealing the endoscope.

In the preceding, the present invention is described using a preferred embodiment without the intention of limiting the scope or spirit of the overall inventive idea. Nonetheless, reference is made to the drawing for illustration of all the details not explained in more detail herein.

What is claimed is:

1. An endoscope having:

an endoscope objective lens attached to a distal end of the endoscope;

an image relay which transmits an image from the endoscope objective lens to a proximal end of the endoscope; and a two-position multiple lens group eyepiece through which the image transmitted by said image relay may be observed, and which permits:

adjusting a magnification of the image by moving at least one lens group, and focusing the image by moving all the lens groups of said eyepiece, with a lens group of said eyepiece not moved for adjusting magnification being contained in a first tube in which at least one other tube containing said lens group moved for adjusting said magnification is conveyed in a moveable manner, said other tube being fixed in two magnification positions by a releasable lock in said first tube, and adjusting wheel for adjusting the magnification and focusing, said adjusting wheel acting on said other tube in such a manner that when said adjusting wheel is rotated first, said first and said other tube are moved jointly and then movement of said first tube is limited by a stop in such a manner that when said adjusting wheel is rotated again, said other tube is conveyed from one such magnification position to the other magnification position.

2. An endoscope according to claim 1, wherein the releasable lock comprises a spring-biased ball.

3. An endoscope according to claim 1, wherein said adjusting wheel acts on said other tube via a gear.

4. An endoscope according to claim 1, wherein two groups of lenses are moveable for adjusting magnification.

5. An endoscope according to claim 4, characterized by the fact that one of said two groups of lenses moveable for magnification is contained in said other tube and the other lens group moveable for magnification is contained in a third tube, and wherein said third tube is pretensioned by a spring in the direction of said second tube.

6. An endoscope according to claim 1, characterized by the fact that a glass cover is provided in the eyepiece.

7. An endoscope according to claim 1 characterized by the following data of the optical system of said eyepiece in one of the two magnification positions:

| Surface No. | Radius | Air space/thickness | Material |
|---|---|---|---|
| 1 | plane | 11.67 | air |
| 2 | 62.64 | 3.50 | SKS |
| 3 | −15.18 | .40 | air |
| 4 | 17.53 | 5.50 | SK16 |
| 5 | −12.32 | 1.0 | SKL6 |
| 6 | −145.38 | 8.57 | air |
| 7 | plane | 10.33 | air |
| 8 | 20.54 | 2.50 | S-SFL56 |
| 9 | plane | .20 | air |
| 10 | 4.22 | 4.00 | S-SF5 |
| 11 | −11.63 | 1.0 | S-SFL56 |
| 12 | 1.94 | 3.391 | air |
| 13 | 7.29 | 1.80 | S-LAF3 |
| 14 | −2.05 | 1.10 | S-SF10 |
| 15 | −5.87 | 6.64 | air |
| 16 | −3.50 | 1.75 | S-BAK4 |
| 17 | −2.05 | .90 | S-SFL56 |
| 18 | −4.47 | .20 | air |

-continued

| Surface No. | Radius | Air space/thickness | Material |
|---|---|---|---|
| 19 | 5.6 | 2.0 | S-SFI10 |
| 20 | plane | 3.91 | air. |

8. An endoscope comprising:

a shaft;

an objective lens attached at a distal end of said shaft;

an image relay for transmitting an image from said objective lens to a proximal end of said shaft;

an eyepiece mounted to view the image transmitted by said image relay;

first and second lens groups moveably mounted within said eyepiece for focusing the image, one of said lens groups moveable relative to the other lens group between first and second positions to vary a magnification of the image;

a first tube for mounting the other of said lens groups;

a second tube for mounting said one lens group, said second tube moveably mountable within and releasably lockable with said first tube; and an adjusting wheel acting on one of the first and second tubes for moving said first tube to move both said lens groups to focus the image, and for moving said second tube relative to said first tube to move said one lens group between the first and second positions.

* * * * *